May 15, 1962 W. T. HUNT ETAL 3,034,654
CENTRIFUGE
Filed July 15, 1959 2 Sheets-Sheet 1

INVENTORS.
WILLIAM T. HUNT,
LLOYD E. COMPTON,
BY RUFUS B. BENNETT,

*John S. Schneider*
ATTORNEY.

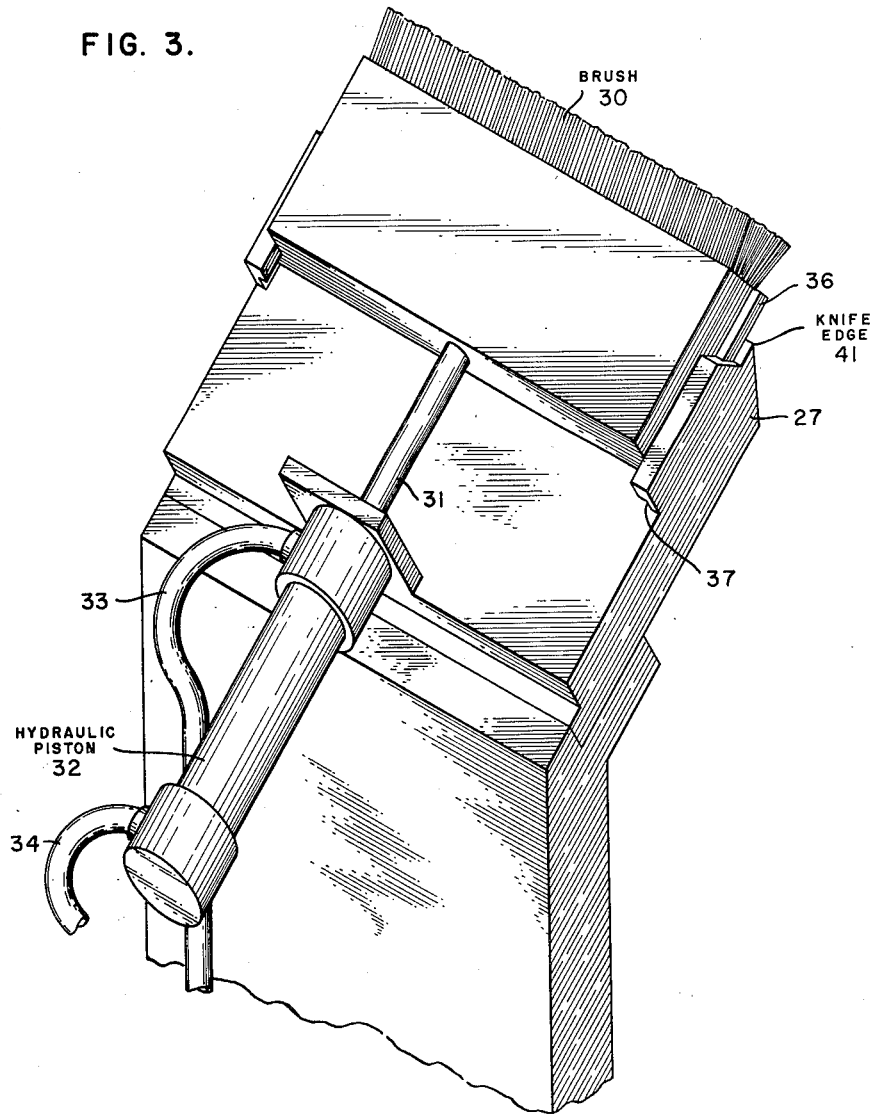

United States Patent Office 3,034,654
Patented May 15, 1962

3,034,654
CENTRIFUGE
William T. Hunt and Lloyd Edison Compton, Baytown, Tex., and Rufus B. Bennett, Scarsdale, N.Y., assignors, by mesne assignments, to Esso Research and Engineering Company, Elizabeth, N.J., a corporation of Delaware
Filed July 15, 1959, Ser. No. 827,377
1 Claim. (210—372)

This invention is directed to an improved centrifuge apparatus especially useful in the production of polypropylene.

One stage in the production of polypropylene involves separating the solid polymer from the liquid of a feed slurry in a perforated basket type centrifuge. A cycle of operation includes feeding the slurry to the basket, spinning the basket to centrifuge off the liquids, and cutting from the basket the retained polymer filter cake. However, a portion of the filter cake termed a rind or heel cannot be removed by cutting off the filter cake from the screen of the basket because to avoid damage to the equipment the cutting instrument must be kept spaced from the screen a safe distance. After several cycles of operation the capacity of the centrifuge is reduced sharply because of (1) packing of the thick heel remaining in the basket after each cycle, (2) glazing of the surface of this heel with the knife used for removal of the cake, and (3) retention and buildup of the impurities and oily polymer in the heel thereby restricting flow. Consequently, to increase centrifuge capacity, it is necessary to remove the heel from the centrifuge after one or more cycles of operation. Attempts to wash or dissolve or melt away the heel have failed.

This invention provides an effective means for removing the heel whenever it is desired to do so by employing a brush hydraulically mounted on the cake removal knife. The brush contacts and removes the heel following one or more cycles of operation. The brush also contacts and thoroughly cleans the screen.

In brief, the invention comprises a rotatable perforate basket in which is arranged a knife member upon which is mounted a brush member which is movable beyond the edge of the knife member a distance sufficient to contact the basket.

Therefore, an object of the present invention is to provide an improved centrifuge which utilizes a brush for removing a portion of the filter cake.

This and other objects and advantages of the invention will be apparent from a description thereof taken in conjunction with the drawings wherein:

FIG. 3 is an enlarged view of the brush mechanism mounted on the knife member.

Figure 1:
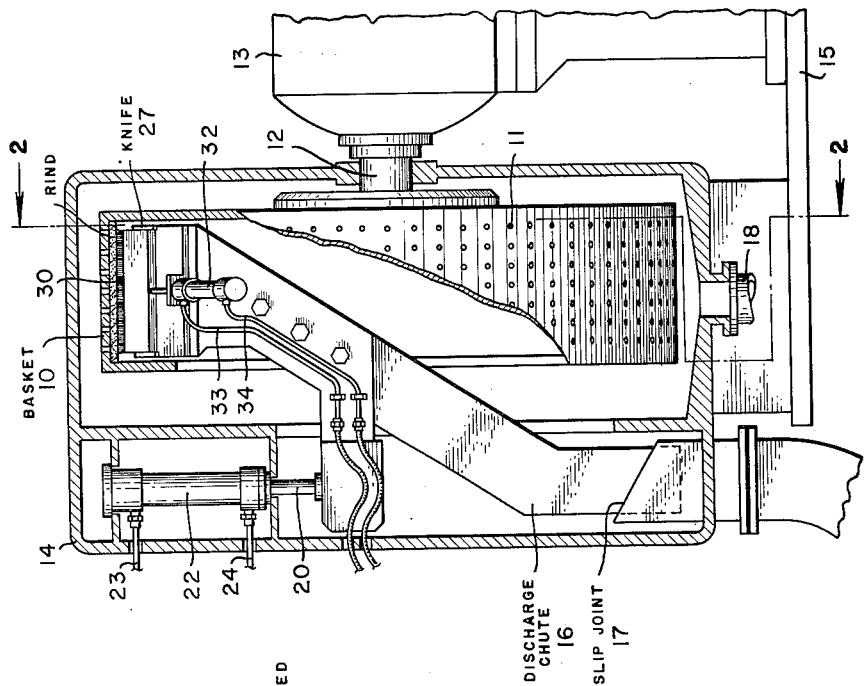
FIG. 1 is a vertical, partially sectional view of the centrifuge.

Referring to the drawings in greater detail, in FIG. 1 is shown a rotatable basket 10 provided with perforations 11 and mounted on a drive shaft 12 which is driven by any suitable type prime mover 13. A casing 14 encloses basket 10 and the entire assembly is supported on a foundation indicated at 15. An open-ended, vertically movable filter cake discharge chute 16 is arranged in casing 14. The lower end of chute 16 extends into a discharge conduit 17 and the funnel-shaped upper end of chute 16 extends into the upper end of basket 10. A liquid filtrate discharge conduit 18 is provided in the lower end of casing 14. The mechanism for moving chute 16 vertically includes a piston 20 which is connected to a plate member 21 which is secured, in turn, to chute 16. Piston 20 reciprocates in a cylinder 22, the ends of which are connected to fluid pressure inlet and outlet conduits 23 and 22. A knife 27, which is approximately the width of the perforated filter area, is mounted on chute 16 and it is positioned to extend beyond the upper end of chute 16. A brush 30 of approximately the same width as knife 27 is mounted on knife 27 and is movable from a retracted position behind to an extended position beyond the edge of knife 27. Brush 30 is connected to a piston 31 which is arranged to reciprocate in a cylinder 32 to which is connected fluid pressure inlet and outlet conduits 33 and 34. As seen more clearly in FIG. 2, a charge or feed slurry inlet conduit 35 extends through casing 14 into the interior of basket 10. The mounting of brush 30 on knife 27 is seen more clearly in FIG. 3. As shown therein, brush 30 is provided with a flange 36 which travels in a groove 37 formed on the upper or back side of knife 27.

Figure 2:
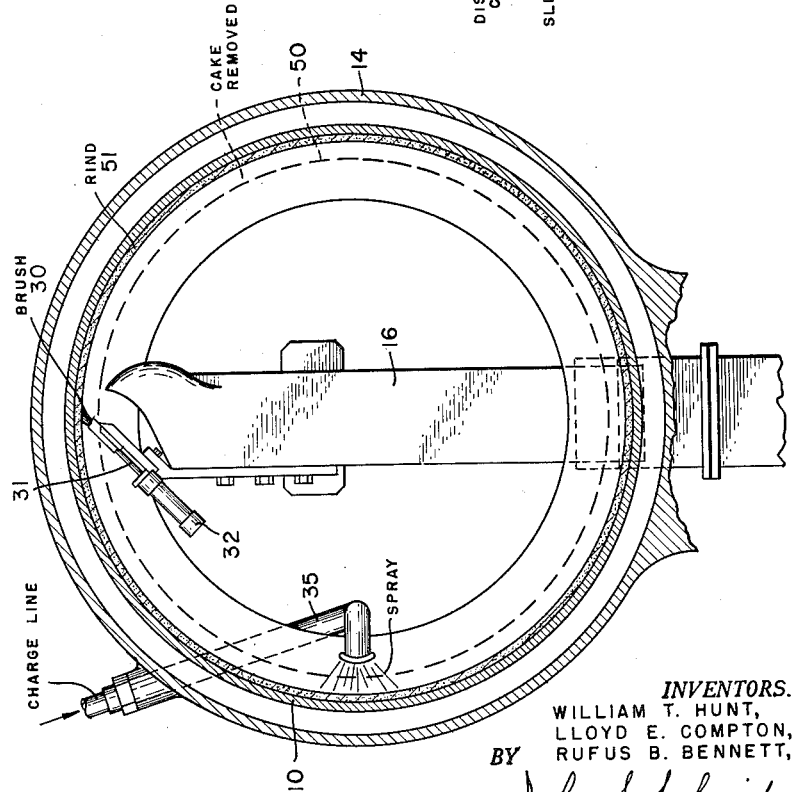
FIG. 2 is a view taken on lines 2—2 of FIG. 1.

In operation, discharge chute 16 is placed in its retracted position, by applying fluid pressure through conduit 23 to cylinder 22 and releasing fluid pressure from cylinder 22 through conduit 24, which maintains piston 20 and connected chute 16 in their lowermost positions. Also, brush 30 is maintained in its retracted position by applying fluid pressure to cylinder 32 via conduit 33 and releasing fluid pressure from cylinder 32 via conduit 34. With these members in their retracted positions, a polypropylene slurry is fed to the basket centrifuge 10 through conduit 35 and the centrifuge basket 10 is rotated at centrifugal speeds by prime mover 13. The centrifuge spins continuously. Periodically, the feed slurry sprays onto perforations 11 in basket 10 and a filter cake 50 forms as the solid polymer separates from the liquid which discharges through conduit 18. When it is desired to remove the filter cake, fluid pressure is released from cylinder 22 via conduit 23 and applied to cylinder 22 through conduit 24 to move piston 20 and connected chute 16 upwardly. This action causes the edge 41 of knife 27 to engage filter cake 50. In this manner the filter cake is cut from basket 10 after which it falls into chute 16 and is discharged through conduit 17. As shown in FIG. 2, rotation of the basket is counterclockwise. Rind 51 remains after knife 27 has removed as much of the filter cake it is capable of removing. To remove the rind or heel portion 51, fluid pressure is applied to cylinder 32 via conduit 34 and fluid pressure in cylinder 32 is released via conduit 33. This causes piston 31 to move in the direction of rind 51. The brush contacts and sweeps the rind into chute 16 thereby cleaning the interior perforated surface of basket 10.

Once the rind has been removed, brush 30 is retracted behind knife 27 by reversing application of fluid pressure; that is, by applying fluid pressure through conduit 33 and releasing fluid pressure from cylinder 32 via conduit 34. The knife is also retracted by reversing the direction of the fluid in cylinder 22; that is, by applying fluid pressure to conduit 23 and releasing fluid pressure through conduit 24.

Then the cycle of filling and dumping is repeated. The rind may be removed after each cycle or it may be removed whenever it begins to become impervious to the filtrate as desired.

Although details of mechanism for making the operation automatic have not been shown and described, automatic operation is preferred. Any suitable system for automatically filling and dumping may be used.

Having fully described the nature, objects, and operation of our invention, we claim:

Centrifuge apparatus for centrifuging a feed slurry comprising a rotatable, cylindrical basket provided with perforations and adapted to retain a filter cake; a chute for discharging said filter cake arranged in said basket and movable toward and away from said retained filter cake; fluid pressure motor means connected to said chute for moving it; a knife member carried by said chute and movable therewith adapted to cut said filter cake from said basket; a brush member mounted on said knife member and movable beyond the edge of said knife member in the direction of said filter cake adapted to contact and remove filter cake not removed by said knife member as well as brush and clean said basket perforations; and additional fluid pressure motor means connected to said brush member for moving it.

References Cited in the file of this patent
UNITED STATES PATENTS

| | | |
|---|---|---|
| 2,184,598 | Jahn | Dec. 26, 1939 |
| 2,687,542 | Turausky | Aug. 31, 1954 |
| 2,760,640 | Bennet et al. | Aug. 28, 1956 |